US012247935B2

(12) United States Patent
Nagoshi et al.

(10) Patent No.: US 12,247,935 B2
(45) Date of Patent: Mar. 11, 2025

(54) X-RAY FLUORESCENCE SPECTROMETER

(71) Applicant: RIGAKU CORPORATION, Akishima (JP)

(72) Inventors: Yasuhiko Nagoshi, Takatsuki (JP); Toshiaki Kozuki, Takatsuki (JP); Yuki Fujimoto, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/767,325

(22) Filed: Jul. 9, 2024

(65) Prior Publication Data

US 2024/0361263 A1    Oct. 31, 2024

Related U.S. Application Data

(63) Continuation of application No. PCT/JP2022/041752, filed on Nov. 9, 2022.

(30) Foreign Application Priority Data

Jan. 13, 2022  (JP) .................. 2022-003823

(51) Int. Cl.
*G01N 23/223* (2006.01)
(52) U.S. Cl.
CPC ..... *G01N 23/223* (2013.01); *G01N 2223/076* (2013.01); *G01N 2223/1016* (2013.01)
(58) Field of Classification Search
CPC .............. G01N 23/223; G01N 2223/076
See application file for complete search history.

(56) References Cited

U.S. PATENT DOCUMENTS 10,837,925 B1 * 11/2020 Suzuki ............... G01K 7/16
2021/0325323 A1 * 10/2021 Grof ................ G01N 23/2206

FOREIGN PATENT DOCUMENTS

| CN | 103308540 A | 9/2013 |
| CN | 203376124 U | 1/2014 |
| CN | 107340101 B | 11/2017 |

(Continued)

OTHER PUBLICATIONS

International Preliminary Report on Patentability of PCT/JP2022/041752, dated Jul. 25, 2024, PCT/ISA/338.

(Continued)

*Primary Examiner* — Chih-Cheng Kao
(74) *Attorney, Agent, or Firm* — Sughrue Mion, PLLC

(57) ABSTRACT

An X-ray fluorescence spectrometer includes: a vacuum chamber (17) configured to be evacuated including at least a detection chamber in which a detector is disposed; drive units (18A to 18H) each including a drive source outside the vacuum chamber (17), and configured to perform a mechanical operation in the vacuum chamber (17); and a vacuum leakage location identification unit (23A, 23B) configured to: operate the drive units (18A to 18H) one at a time while monitoring a degree of vacuum in the vacuum chamber (17); if the change in the degree of vacuum in the vacuum chamber (17) before and after each operation is greater than or equal to a predetermined threshold, identify the relevant one of the drive units (18A to 18H) as a vacuum leakage location; and cause information to that effect to be displayed in a display unit (19) and/or be recorded in a recording unit (21).

4 Claims, 1 Drawing Sheet

(56) References Cited

FOREIGN PATENT DOCUMENTS

| | | | |
|---|---|---|---|
| JP | 2002-168812 | A | 6/2002 |
| JP | 2003-215073 | A | 7/2003 |
| JP | 2010-217020 | A | 9/2010 |
| JP | 2012-7928 | A | 1/2012 |
| JP | 5540235 | B2 | 7/2014 |
| JP | 2002-098658 | A | 4/2022 |

OTHER PUBLICATIONS

International Search Report for PCT/JP2022/041752 dated Dec. 20, 2022.

Ono, Kanji; "Nondestructive Testing"; Ullmann's Encyclopedia of Industrial Chemistry; Jun. 15, 2000; pp. 1-35.

\* cited by examiner

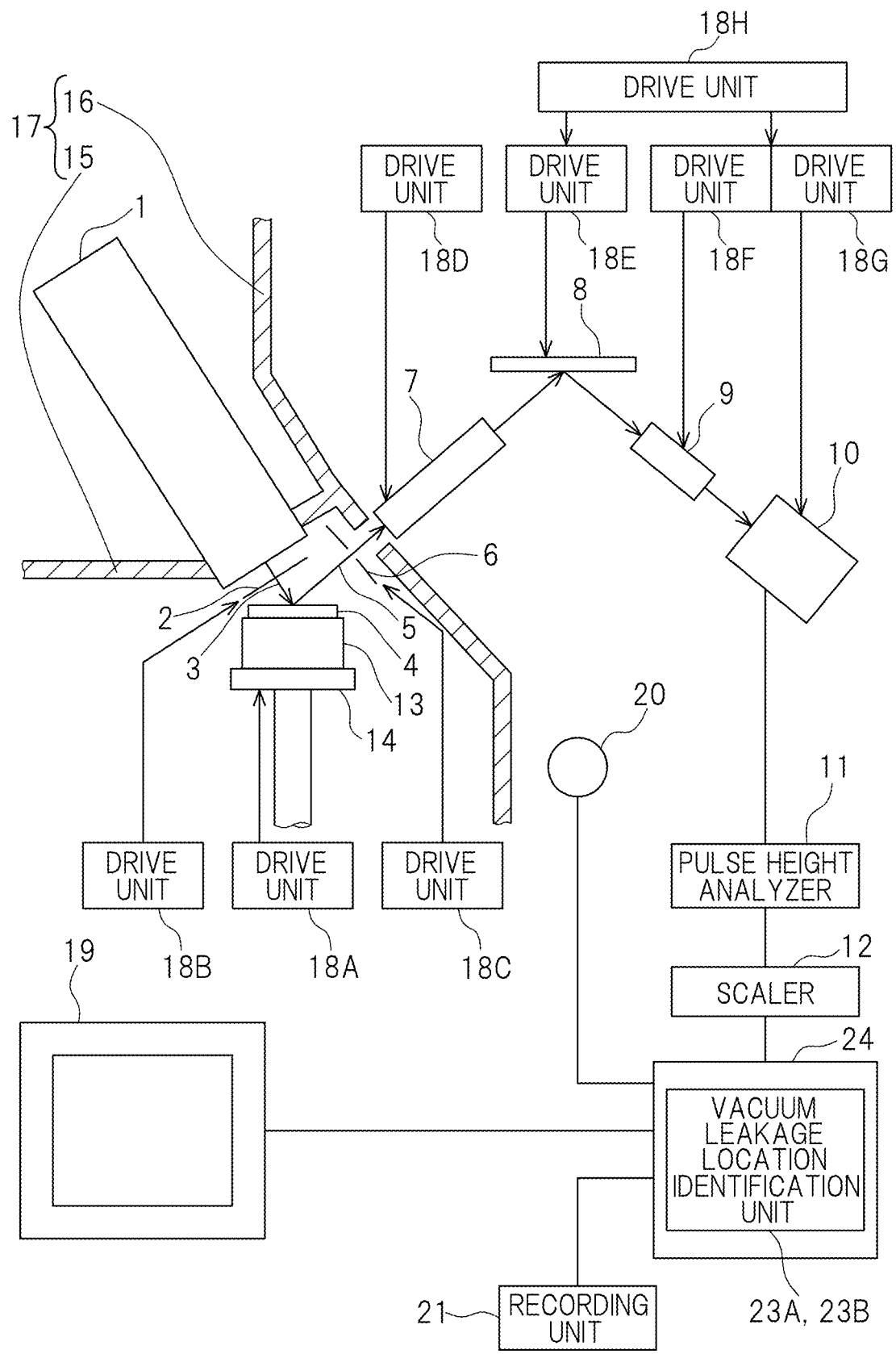

X-RAY FLUORESCENCE SPECTROMETER

CROSS REFERENCE TO THE RELATED APPLICATION

This application is a continuation application, under 35 U.S.C. § 111(a), of international application No. PCT/JP2022/041752, filed Nov. 9, 2022, which claims priority to Japanese patent application No. 2022-003823 filed Jan. 13, 2022, the entire disclosures of all of which are herein incorporated by reference as a part of this application.

BACKGROUND OF THE INVENTION

Field of the Invention

The present invention relates to an X-ray fluorescence spectrometer including a plurality of drive units each including a drive source outside a vacuum chamber to be evacuated, and configured to perform a mechanical operation in the vacuum chamber.

Description of Related Art

Conventionally, in order to irradiate a sample disposed in a sample chamber with primary X-rays, and measure intensities of the generated secondary X-rays using a detector disposed in a detection chamber, an X-ray fluorescence spectrometer includes a plurality of drive units, such as a sample changer, a filter changer, a diaphragm changer, a slit changer, a spectroscopic device changer, and a goniometer, each including a drive source and configured to perform a mechanical operation in a vacuum chamber, in order to change samples and set an appropriate optical system for each sample. Here, the vacuum chamber is evacuated including at least the detection chamber.

It is not preferable to place drive sources such as motors in the vacuum chamber that is to be evacuated. Accordingly, the drive sources are disposed outside the vacuum chamber, and transmit power for performing mechanical operations in the vacuum chamber through shafts or the like extending through holes formed in a peripheral wall, a top portion, or a bottom portion of the vacuum chamber. A gap between each of the holes formed in the vacuum chamber and the shaft or the like extending therethrough is sealed so as to allow relative movement therebetween. However, for example, degradation over time of a sealing member may cause vacuum leakage of the vacuum chamber. If this degradation progresses, a required degree of vacuum cannot be reached, so that the X-ray fluorescence spectrometer becomes unusable.

As for the vacuum leakage of the vacuum chamber, an X-ray fluorescence spectrometer that includes a measurement unit configured to measure a degree of vacuum or the like in a vacuum chamber has been available, and the X-ray fluorescence spectrometer is configured to detect abnormality in the degree of vacuum during analysis, and display warning information or abnormality information relating to a vacuum control system, or a time-series of measured values of the degree of vacuum obtained during a period of several minutes before the occurrence of abnormality (see e.g., claim 1, and paragraphs 0017 and 0018 of Patent Document 1). Note that an analysis chamber including a sample chamber and a spectroscopic chamber in this X-ray fluorescence spectrometer corresponds to a vacuum chamber to be evacuated according to the present invention.

RELATED DOCUMENT

Patent Document

[Patent Document 1] Japanese Patent No. 5540235

SUMMARY OF THE INVENTION

However, for this X-ray fluorescence spectrometer, the relationship between the vacuum leakage of the vacuum chamber and the drive units is not taken into consideration. Therefore, which of the plurality of drive units is a vacuum leakage location cannot be identified from the displayed information. Accordingly, even if warning information or abnormality information is displayed, time is required for a subsequent measure such as maintenance. In particular, if abnormality information indicating that measurement is virtually impossible is displayed, there will be a long period of time during which the X-ray fluorescence spectrometer is not usable until the repair for the vacuum leakage is completed.

The present invention has been made in view of the above-described conventional problem, and an object thereof is to provide an X-ray fluorescence spectrometer capable of detecting vacuum leakage of a vacuum chamber caused by a drive unit by automatically identifying the drive unit.

In order to attain the above-described object, an X-ray fluorescence spectrometer according to a first configuration of the present invention is an X-ray fluorescence spectrometer configured to irradiate, with primary X-rays, a sample disposed in a sample chamber, and measure intensities of generated secondary X-rays using a detector disposed in a detection chamber, the X-ray fluorescence spectrometer including: a vacuum chamber configured to be evacuated including at least the detection chamber; a plurality of drive units each including a drive source outside the vacuum chamber, and configured to perform a mechanical operation in the vacuum chamber; and a vacuum leakage location identification unit configured to: operate the drive units one at a time while monitoring a degree of vacuum in the vacuum chamber; if a change in the degree of vacuum in the vacuum chamber before and after each of the operations is greater than or equal to a predetermined threshold, identify the relevant drive unit as a vacuum leakage location; and cause information to that effect to be displayed in a display unit and/or be recorded in a recording unit.

In the X-ray fluorescence spectrometer according to the first configuration, the vacuum leakage location identification unit operates the drive units one at a time while monitoring the degree of vacuum in the vacuum chamber. If the change in the degree of vacuum in the vacuum chamber before and after each of the operations is greater than or equal to a predetermined threshold, the vacuum leakage location identification unit identifies the relevant drive unit as a vacuum leakage location. Accordingly, it is possible to detect vacuum leakage of the vacuum chamber caused by a drive unit by automatically identifying the drive unit. Therefore, it is possible to reduce the time required for a measure such as maintenance after the identification, and take a preventive measure before measurement becomes virtually impossible, by appropriately setting a predetermined threshold.

An X-ray fluorescence spectrometer according to a second configuration of the present invention is an X-ray fluorescence spectrometer configured to irradiate, with primary X-rays, a sample disposed in a sample chamber, and measure intensities of generated secondary X-rays using a detector disposed in a detection chamber, the X-ray fluorescence spectrometer including: a vacuum chamber configured to be evacuated including at least the detection chamber; a plurality of drive units each including a drive source outside the vacuum chamber, and configured to perform a mechanical operation in the vacuum chamber; and a vacuum leakage location identification unit configured to: monitor a degree of vacuum in the vacuum chamber; as for an operation of one of the drive units and overlapping operations of more than one of the drive units, if a change in the degree of vacuum in the vacuum chamber before and after each of the operations is greater than or equal to a predetermined threshold, identify the drive unit or the drive units as a vacuum leakage location or vacuum leakage locations; and cause information to that effect to be displayed in a display unit and/or be recorded in a record unit.

In the X-ray fluorescence spectrometer according to the second configuration, the vacuum leakage location identification unit monitors the degree of vacuum in the vacuum chamber during a routine operation including analysis, initialization before analysis, and maintenance such as automatic diagnosis. As for an operation of one of the drive units and overlapping operations of more than one of the drive units, if a change in the degree of vacuum in the vacuum chamber before and after each of the operations is greater than or equal to a predetermined threshold, the vacuum leakage location identification unit identifies the drive unit or the drive units as a vacuum leakage location or vacuum leakage locations. Accordingly, it is possible to detect a vacuum leakage of the vacuum chamber caused by a drive unit by automatically identifying the drive unit. Therefore, it is possible to reduce the time required for a measure such as maintenance after the determination, and take a preventive measure before measurement becomes virtually impossible, by appropriately setting a predetermined threshold.

In the X-ray fluorescence spectrometer according to the first or second configuration, the sample chamber may be in communication with the detection chamber, or may be included in the vacuum chamber.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawing. However, the embodiments and the drawing are given only for the purpose of illustration and explanation, and are not to be taken as limiting the scope of the present invention in any way whatsoever, the scope of which is to be determined by the appended claims. In the accompanying drawing, like reference numerals are used to denote like parts, and:

The FIGURE is a schematic diagram showing an X-ray fluorescence spectrometer according to first and second embodiments of the present invention.

DESCRIPTION OF THE EMBODIMENTS

Hereinafter, an X-ray fluorescence spectrometer according to a first embodiment of the present invention will be described. As shown in the FIGURE, this spectrometer is an X-ray fluorescence spectrometer configured to irradiate a sample 4 with primary X-rays 3, and measure intensities of generated secondary X-rays 5 such as fluorescent X-rays using a detector 10. A sample chamber 15 in which the sample 4 is disposed is in communication with a detection chamber 16 in which the detector 10 is installed, and the sample chamber 15 and the detection chamber 16 constitute a vacuum chamber 17 that is to be evacuated.

This spectrometer includes: an X-ray tube 1 configured to generate X-rays; a filter 2 configured to allow passage of X-rays, in a predetermined wavelength band, for which the attenuation rate of the X-ray intensity has been increased, among the X-rays generated from the X-ray tube 1, as primary X-rays 3 to irradiate the sample 4; a diaphragm 6 configured to restrict a field of view of the secondary X-rays 5 generated from the sample 4 as viewed from the detector 10 side; a divergence slit (soller slit) 7 configured to allow the secondary X-rays that have passed through the diaphragm 6 to pass therethrough in a limited direction; a spectroscopic device 8 configured to monochromate the secondary X-rays that have passed through the divergence slit 7; a receiving slit (soller slit) 9 configured to allow the secondary X-rays that have been monochromated by the spectroscopic device 8 to pass therethrough in a limited direction; and a detector 10, a pulse height analyzer 11, and a scaler 12 that are configured to measure intensities of the secondary X-rays that have passed through the receiving slit 9. The pulse height analyzer 11 and the scaler 12 may be a multi-channel analyzer.

As in the case of the X-ray fluorescence spectrometer described as a related art, in order to change samples and set an appropriate optical system for each sample, this spectrometer further includes a plurality of drive units 18A to 18G (schematically illustrated as blocks) each including a drive source (not shown) such as a motor outside the vacuum chamber 17 and configured to perform a mechanical operation in the vacuum chamber 17. The drive sources are disposed outside the vacuum chamber 17, and transmit power for performing mechanical operations in the vacuum chamber 17 through shafts or the like extending through holes formed in a peripheral wall, a top portion, or a bottom portion of the vacuum chamber 17. A gap between each of the holes formed in the vacuum chamber 17 and the shaft or the like extending therethrough is sealed so as to allow relative movement therebetween.

The sample 4 is placed on a sample stage 14 via a sample holder 13, and is changed by a sample changer serving as the drive unit 18A. In order to allow measurement of the intensities of secondary X-rays having various wavelengths, the spectroscopic device 8, the receiving slit 9, and the detector 10 are interlocked by a goniometer serving as a drive unit 18H. That is, the X-ray fluorescence spectrometer is a wavelength dispersive, sequential spectrometer. Although only one filter 2, one diaphragm 5, one divergence slit 7, one spectroscopic device 8, one receiving slit 9, and one detector 10 are shown, a plurality of filters 2, diaphragms 5, divergence slits 7, spectroscopic devices 8, receiving slits 9, and detectors 10 having different types (properties) are actually provided, and a filter changer, a diaphragm changer, a divergence slit changer, a spectroscopic device changer, a receiving slit changer, and a detector changer respectively serving as the drive units 18B, 18C, 18D, 18E, 18F, and 18G select any one of the corresponding components.

A signal from the scaler 12 is input to a control unit 24 such as a computer that performs overall control of the spectrometer. A pressure sensor 20 for monitoring the degree of vacuum is provided in the vacuum chamber 17, and an output therefrom is also input to the control unit 24. The X-ray fluorescence spectrometer according to the first embodiment includes a vacuum leakage location identification unit 23A as a program loaded in the control unit 24, and the vacuum leakage location identification unit 23A operates the drive units 18A to 18G one at a time while monitoring the degree of vacuum in the vacuum chamber 17. If the change in the degree of vacuum in the vacuum chamber 17 before and after each of the operations is greater than or equal to a predetermined threshold, the vacuum leakage location identification unit 23A identifies the relevant drive unit as a vacuum leakage location, and causes information to that effect to be displayed in a display unit 19 such as a liquid crystal display, and be recorded in a recording unit 21 such as a hard disk. Note that only one of the display in the display unit 19 and the recording in the recording unit 21 may be performed.

Next, operations of this spectrometer will be described. When an operator periodically, or as needed, inputs that a vacuum leakage check is to be performed, to the control unit 24 from an input unit (not shown), the vacuum leakage location identification unit 23A operates the drive units 18A to 18G one at a time while monitoring the degree of vacuum in the vacuum chamber 17. If the change in the degree of vacuum in the vacuum chamber 17 before and after each of the operations is greater than or equal to a predetermined threshold, for example, greater than or equal to 0.2 Pa, or in other words, if the pressure in the vacuum chamber 17 has increased to be greater than or equal to 0.2 Pa, and the degree of vacuum has worsened to be greater than or equal to 0.2 Pa, the vacuum leakage location identification unit 23A identifies the relevant drive unit as a vacuum leakage location, and causes information to that effect to be displayed in the display unit 19, and be recorded in the recording unit 21.

For example, when the change in the degree of vacuum before and after the operation of the drive unit 18B serving as the filter changer is greater than or equal to 0.2 Pa, the drive unit 18B is identified as a vacuum leakage location, and information such as "The degree of vacuum has worsened as a result of operating the filter changer. The sealing member of the filter changer may have deteriorated. Please contact our service center." is displayed on the display unit 19, and recorded in the recording unit 21.

In this manner, in the X-ray fluorescence spectrometer according to the first embodiment, the vacuum leakage location identification unit 23A operates the drive units 18A to 18G one at a time while monitoring the degree of vacuum in the vacuum chamber 17, and if the change in the degree of vacuum in the vacuum chamber 17 before and after each of the operations is greater than or equal to a predetermined threshold, identifies the relevant drive unit as a vacuum leakage location. Accordingly, it is possible to detect vacuum leakage of the vacuum chamber 17 caused by any of the drive units 18A to 18G by automatically identifying the drive unit. Therefore, it is possible to reduce the time required for a measure such as maintenance after the identification, and take a preventive measure before measurement becomes virtually impossible, by appropriately setting a predetermined threshold.

Next, an X-ray fluorescence spectrometer according to a second embodiment of the present invention will be described. The X-ray fluorescence spectrometer according to second embodiment differs from the X-ray fluorescence spectrometer according to the first embodiment described above only with regard to the details of a vacuum leakage location identification unit 23B. Therefore, only the vacuum leakage location identification unit 23B and operations of the X-ray fluorescence spectrometer of the second embodiment that are performed by the vacuum leakage location identification unit 23B will be described.

The vacuum leakage location identification unit 23B of the X-ray fluorescence spectrometer according to the second embodiment monitors a degree of vacuum in the vacuum chamber 17. As for an operation of one of the drive units and overlapping operations of more than one of the drive units, if a change in the degree of vacuum in the vacuum chamber 17 before and after each of the operations is greater than or equal to a predetermined threshold, the vacuum leakage location identification unit 23B identifies the drive unit or the drive units as a vacuum leakage location or vacuum leakage locations, and causes information to that effect to be displayed in the display unit 19, and be recorded in the recording unit 21. Note that only one of the display in the display unit 19 and the recording in the recording unit 21 may be performed.

In the X-ray fluorescence spectrometer according to the second embodiment, there is no need for an operator to input that a vacuum leakage check is to be performed, and the vacuum leakage location identification unit 23B monitors the degree of vacuum in the vacuum chamber 17 during a routine operation including analysis, initialization before analysis, and maintenance such as automatic diagnosis. As for an operation of one of the drive units and overlapping operations of more than one of the drive units, if the change in the degree of vacuum in the vacuum chamber 17 before and after each of the operations is greater than or equal to a predetermined threshold, for example, greater than or equal to 0.2 Pa, the vacuum leakage location identification unit 23B identifies the drive unit or the drive units as a vacuum leakage location or vacuum leakage locations, and causes information to that effect to be displayed in the display unit 19, and be recorded in the recording unit 21.

For example, during analysis, as for overlapping operations of the drive unit 18E serving as the spectroscopic device changer and the drive unit 18G serving as the detector changer, if the change in the degree of vacuum before and after the operations is greater than or equal to 0.2 Pa, the drive unit 18E and the drive unit 18G are identified as vacuum leakage locations, and information such as "The degree of vacuum has worsened as a result of operating the spectroscopic device changer and the detector changer. The sealing member of the spectroscopic device changer and/or the sealing member of the detector changer may have deteriorated. Please contact our service center." is displayed in the display unit 19 and recorded in the recording unit 21.

In this manner, in the X-ray fluorescence spectrometer according to the second embodiment, the vacuum leakage location identification unit 23B monitors the degree of vacuum in the vacuum chamber 17 during a routine operation including analysis, initialization before analysis, and maintenance such as automatic diagnosis. As for an operation of one of the drive units and overlapping operations of more than one of the drive units, if the change in the degree of vacuum in the vacuum chamber 17 before and after each of the operations is greater than or equal to a predetermined threshold, the vacuum leakage location identification unit 23B identifies the drive unit or the drive units as a vacuum leakage location or vacuum leakage locations. Accordingly, it is possible to detect vacuum leakage of the vacuum chamber caused by any of the drive units 18A to 18G by automatically identifying the relevant drive unit(s). Therefore, it is possible to reduce the time required for a measure such as maintenance after the determination, and take a preventive measure before measurement becomes virtually impossible, by appropriately setting a predetermined threshold.

In the X-ray fluorescence spectrometers according to the first and second embodiments, the sample chamber 15 is in communication with the detection chamber 16, and the sample chamber 15 and the detection chamber 16 constitute the vacuum chamber 17 that is to be evacuated. However, in the case where the sample 4 is liquid or powder that is scattered in a vacuum, these two chambers may be separated by a partition wall so as not to be in communication with each other, and only the detection chamber 16 may be used as the vacuum chamber 17 that is to be evacuated. In this case, the drive units 18D to 18G each configured to perform a mechanical operation in the detection chamber 16 serving as the vacuum chamber 17 are subjected to identification performed by the vacuum leakage location identification units 23A and 23B.

The X-ray fluorescence spectrometer according to the present invention may include both the vacuum leakage location identification unit 23A of the first embodiment and the vacuum leakage location identification unit 23B of the second embodiment. In this case, during a routine operation including analysis, initialization before analysis, and maintenance such as automatic diagnosis, the vacuum leakage location identification unit 23B checks if there is a vacuum leakage in the vacuum chamber 17 caused by the drive units 18A to 18G, without requiring the operator to pay any special attention. For example, if a plurality of drive units 18E and 18G operating in an overlapping manner are identified as vacuum leakage locations, the vacuum leakage locations can be further narrowed down by the vacuum leakage location identification unit 23A. Furthermore, although each of the X-ray fluorescence spectrometers according to the first and second embodiments has been described as a wavelength dispersive, sequential X-ray fluorescence spectrometer, the X-ray fluorescence spectrometer according to the present invention may be a wavelength dispersive, simultaneous multi-elements analysis-type X-ray fluorescence spectrometer, or an energy dispersive X-ray fluorescence spectrometer. Specific drive units that are to be included vary depending on an X-ray fluorescence spectrometer embodying the present invention.

Although the present invention has been fully described in connection with the preferred embodiments thereof with reference to the accompanying drawing which is used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

3 . . . primary X-rays
4 . . . sample
5 . . . secondary X-rays
17 . . . vacuum chamber
18A to 18H . . . drive unit
19 . . . display unit
21 . . . recording unit
23A, 23B . . . vacuum leakage location identification unit

What is claimed is:

1. An X-ray fluorescence spectrometer configured to irradiate, with primary X-rays, a sample disposed in a sample chamber, and measure intensities of generated secondary X-rays using a detector disposed in a detection chamber, the X-ray fluorescence spectrometer comprising:
   a vacuum chamber configured to be evacuated including at least the detection chamber;
   a plurality of drive units each including a drive source outside the vacuum chamber, and configured to perform a mechanical operation in the vacuum chamber; and
   a vacuum leakage location identification unit configured to
   operate the drive units one at a time while monitoring a degree of vacuum in the vacuum chamber,
   if a change in the degree of vacuum in the vacuum chamber before and after each of the operations is greater than or equal to a predetermined threshold, identify the relevant drive unit as a vacuum leakage location, and
   cause information to that effect to be displayed in a display unit and/or be recorded in a recording unit.

2. An X-ray fluorescence spectrometer configured to irradiate, with primary X-rays, a sample disposed in a sample chamber, and measure intensities of generated secondary X-rays using a detector disposed in a detection chamber, the X-ray fluorescence spectrometer comprising:
   a vacuum chamber configured to be evacuated including at least the detection chamber;
   a plurality of drive units each including a drive source outside the vacuum chamber, and configured to perform a mechanical operation in the vacuum chamber; and
   a vacuum leakage location identification unit configured to
   monitor a degree of vacuum in the vacuum chamber,
   as for an operation of one of the drive units and overlapping operations of more than one of the drive units, if a change in the degree of vacuum in the vacuum chamber before and after each of the operations is greater than or equal to a predetermined threshold, identify the drive unit or the drive units as a vacuum leakage location or vacuum leakage locations, and
   cause information to that effect to be displayed in a display unit and/or be recorded in a record unit.

3. The X-ray fluorescence spectrometer as claimed in claim 1, wherein the sample chamber is in communication with the detection chamber, and is included in the vacuum chamber.

4. The X-ray fluorescence spectrometer as claimed in claim 2, wherein the sample chamber is in communication with the detection chamber, and is included in the vacuum chamber.

* * * * *